Patented Dec. 6, 1932

1,889,923

UNITED STATES PATENT OFFICE

ROY H. KIENLE, OF SCHENECTADY, NEW YORK, ASSIGNOR TO GENERAL ELECTRIC COMPANY, A CORPORATION OF NEW YORK

RESINOUS CONDENSATION PRODUCT

No Drawing. Application filed July 27, 1928, Serial No. 295,847. Renewed November 4, 1930.

The present invention comprises compositions of drying oil and resins of the polyhydric alcohol-polybasic acid class, which I shall refer to herein as alkyd resins. A well known example of this class of resins is the condensation product of glycerine and phthalic anhydride.

Attempts have been made from time to time to combine these alkyd resins by solution with a drying oil to make varnish-like compositions but the alkyd resins formerly available were found to be insoluble in oils.

In a prior application Serial No. 164,662 I have described and claimed a class of alkyd resins, containing in a combined state an oxidizable, unsaturated, fatty acid, such as a drying oil acid. My present invention comprises an improvement of the process of this prior application.

When carrying out my invention, a loose combination of the drying oil acid is made and this combination is incorporated into the resin during its manufacture. This method of carrying out my invention will perhaps be more fully understood from the following example which describes the incorporation into oil of an alkyd resin containing about 25% of unsaturated fatty acid.

About 100 grams of unsaturated fatty acid, as for example, the acid derived from linseed oil, is heated with 92 grams of glycerine at a temperature of 200 to 250° C. until complete blending of the two ingredients has resulted. A chemical combination of the two constituents occurs at this point, resulting in the formation of a compound having free or uncombined hydroxyl groups other than an oil, such as a monoglyceride, as the amounts used are such that the glycerine is in excess. About 392 grams of linseed oil then is added and the mixture is stirred vigorously until a clear solution is obtained. About 200 grams of phthalic anhydride then are added. This amount of anhydride is sufficient to react with uncombined hydroxy groups of the mono-glyceride. Heating is continued to carry the reaction to such an end point that if a few drops of the resin are placed on a hot plate at about 200° C. it becomes sufficiently polymerized to lose all fluidity in less than five minutes.

In some cases it is preferable to add the oil in two lots, part of the oil being added before the addition of phthalic anhydride and the rest later. For example, as before heat at about 200 to 250° C. a mixture of about 100 grams of the mixed fatty acid derived from linseed oil with about 92 grams of glycerine to cause reaction, forming a mono-glyceride. Thereupon 98 grams of linseed oil are added, the mixture being stirred vigorously until a clear solution is formed. About 200 grams of phthalic anhydride then is added and the reaction is carried to the desired end point as before, whereupon an additional amount of 294 grams of oil is added.

In accordance with the latter method, it is possible to add practically any amount of oil after the initial mixture of resin and oil produced as above has been prepared.

When the fatty acid content of the mixed resin is at least about 45%, then the special precautions above described are not necessary as it is very easy to incorporate such resin in the drying oil to produce a stable mixture by simple heating of the resin and oil when in contact in desired proportions. However, with smaller percentages of fatty acid in the resin, it is found that the resin, although miscible with the oil while hot, tends to separate out on standing. By incorporating part of the drying oil with the resin during manufacture of the resin as above described, such part of the oil is loosely bound in some way to the resin thereby making the mixture more stable. In that case separation of the resin and oil does not occur.

I wish it to be understood that I do not limit myself in the preparation of these resins to the use of glycerine as the polyalcohol and phthalic anhydride as the polybasic acid. Other polyalcohols, glycol, or mannitol, for example, and other polybasic acids, succinic or malic, for example, may be employed either in whole or in part.

Instead of the mixed acids derived from a drying oil, which includes also as minor constituents non-oxidizable acids, I may use one or more oxidizable, unsaturated acids, such as oleo-stearic, linolic or linolenic acids unassociated with other fatty acids.

Furthermore, I do not necessarily limit myself to the use of drying oils, as my invention may be carried out with non-drying fatty oils, such for example as cotton-seed oil. The essential features in this invention are the presence of the oxidizable unsaturated fatty acid in the resin molecule and the use of the methods outlined. The composition of resin and oil made in accordance with my invention is soluble, without separation, in acetone, alcohol-benzol, coal tar oil, acetone oil, butyl acetate, butyl alcohol, ethyl lactate, glycol diacetate, glycol, glycol derivatives, such as the mono-ethyl ether, benzyl acetate, triacetin, phthalate esters, such as diethyl phthalate, or dibutyl phthalate. When the resin has a high fatty acid content then the resin-oil composition is soluble in aliphatics, such as gasoline, petroleum naphtha, etc.

The resin and oil mixture may be mixed with fillers, such as wood flour, asbestos, cotton, ground minerals and other known inert materials and used for the manufacture of molded materials. It may be molded cold or hot. When hot molded, it is customary to precure the molding mixture.

The resin and oil complex or mixture also may be applied as an insulating enamel on wire, such enamel being very adherent and flexible. The mixture is useful as an impregnating and adhesive material in the manufacture of laminated materials from textiles, paper, mica and the like, also as a varnish for metal and wood surfaces; and for coating and impregnating cambric, paper, or other fabrics in order to render them waterproof and of higher insulation value.

What I claim as new and desire to secure by Letters Patent of the United States, is:

1. The method of producing a varnish composition which consists in first forming a mono-glyceride of an oxidizable, unsaturated, fatty acid, then causing said mono-glyceride to be blended with a drying oil, and thereupon adding polybasic organic acid to combine with free hydroxy groups of the mono-glyceride.

2. The method of producing a varnish composition which consists in first forming a mono-glyceride of an oxidizable, unsaturated, fatty acid, then causing said mono-glyceride to be blended with a drying oil, and thereupon adding phthalic anhydride to combine with free hydroxy groups of the mono-glyceride.

3. The method of producing a varnish composition which consists in first forming a mono-glyceride of an oxidizable, unsaturated, fatty acid, causing said mono-glyceride to be blended with a drying oil, thereupon adding polybasic organic acid to combine with free hydroxy groups of the mono-glyceride, and finally adding a second amount of drying oil.

4. The method of producing a varnish composition which consists in first causing reaction between about 100 parts by weight of unsaturated fatty acid derived from linseed oil and about 92 parts of glycerine, dissolving in the resulting composition about 392 parts of linseed oil, thereupon adding about 200 parts of phthalic anhydride and heating to cause reaction.

5. The method of producing a varnish composition which consists in reacting an oxidizable, unsaturated fatty acid with glycerine, the latter being in excess of the proportion required to form an oil, uniting the resulting compound with drying oil and thereupon causing polybasic organic acid to react therewith.

6. The method of producing a varnish composition which consists in reacting a drying oil acid with glycerine, the latter being in excess of the proportion occurring in a corresponding drying oil, adding drying oil to produce a blend of the resulting compound and said drying oil, and reacting said bland with sufficient phthalic anhydride to produce a resin.

7. The method of producing a coating and impregnating composition which consists in producing a reaction between a drying oil acid and polyhydric alcohol, the latter being in excess of the proportions occuring in a corresponding drying oil, adding drying oil and a polybasic organic acid and heating to a reaction temperature.

In witness whereof, I have hereto set my hand this 25th day of July, 1928.

ROY H. KIENLE.